(12) United States Patent
Tenny et al.

(10) Patent No.: US 12,193,088 B2
(45) Date of Patent: Jan. 7, 2025

(54) APPARATUSES AND METHODS FOR SIDELINK (SL) COMMUNICATION IN A USER EQUIPMENT (UE)-TO-UE RELAYING ARCHITECTURE

(71) Applicant: MediaTek Singapore Pte. Ltd., Singapore (SG)

(72) Inventors: Nathan Edward Tenny, San Jose, CA (US); Guan-Yu Lin, Hsinchu (TW); Xuelong Wang, Beijing (CN); Ming-Yuan Cheng, Hsinchu (TW)

(73) Assignee: MEDIATEK SINGAPORE PTE. LTD., Singapore (SG)

( * ) Notice: Subject to any disclaimer, the term of this patent is extended or adjusted under 35 U.S.C. 154(b) by 0 days.

(21) Appl. No.: 18/461,803

(22) Filed: Sep. 6, 2023

(65) Prior Publication Data

US 2023/0422325 A1 Dec. 28, 2023

Related U.S. Application Data

(63) Continuation of application No. 17/995,009, filed as application No. PCT/CN2021/078025 on Feb. 26, 2021, now Pat. No. 11,856,625.

(30) Foreign Application Priority Data

Mar. 30, 2020 (WO) ................ PCT/CN2020/082142

(51) Int. Cl.
*H04W 4/00* (2018.01)
*H04W 76/14* (2018.01)
*H04W 76/15* (2018.01)

(52) U.S. Cl.
CPC .......... *H04W 76/14* (2018.02); *H04W 76/15* (2018.02)

(58) Field of Classification Search
CPC ...... H04W 76/14; H04W 76/15; H04W 76/11
(Continued)

(56) References Cited

U.S. PATENT DOCUMENTS 10,869,363 B2 12/2020 Shan
10,873,895 B2 12/2020 Agiwal
(Continued)

FOREIGN PATENT DOCUMENTS

CN 108809897 A 11/2018
CN 110603892 A 12/2019
(Continued)

OTHER PUBLICATIONS

International Search Report and Written Opinion dated Jun. 2, 2021, issued in application No. PCT/CN2021/078025.
(Continued)

*Primary Examiner* — Marceau Milord
(74) *Attorney, Agent, or Firm* — McClure, Qualey & Rodack, LLP (57) ABSTRACT

A method executed by a relay UE is provided. The relay UE receives an incoming SideLink (SL) transmission from the first remote UE on the first RLC channel, wherein the first RLC channel is associated with an SL Radio Bearer (SLRB) ID, in which the incoming SL transmission includes the first identifier, which includes the SLRB ID and a first UE ID. The relay UE sends an outgoing SL transmission to a second remote UE on a second RLC channel according to the SLRB ID and the first UE ID.

11 Claims, 8 Drawing Sheets

(58) Field of Classification Search
USPC ............................................................ 370/329
See application file for complete search history.

(56) References Cited

U.S. PATENT DOCUMENTS

| | | | |
|---|---|---|---|
| 10,912,114 | B2 | 2/2021 | Baghel et al. |
| 11,856,625 | B2* | 12/2023 | Tenny .................... H04W 76/15 |
| 2016/0212721 | A1 | 7/2016 | Sheng |
| 2016/0212780 | A1* | 7/2016 | Stojanovski .......... H04W 8/005 |
| 2016/0285539 | A1* | 9/2016 | Sadiq .................... H04W 8/005 |
| 2016/0285934 | A1* | 9/2016 | Cheng .................... H04W 4/06 |
| 2017/0111754 | A1* | 4/2017 | Baghel .................. H04W 76/27 |
| 2018/0084442 | A1 | 3/2018 | Lee et al. |
| 2018/0139667 | A1* | 5/2018 | Yu .......................... H04W 76/23 |
| 2018/0234524 | A1* | 8/2018 | Cheng .................... H04W 76/15 |
| 2018/0295497 | A1 | 10/2018 | Kim |
| 2018/0324571 | A1 | 11/2018 | Buckley |
| 2018/0324848 | A1* | 11/2018 | Baghel .................. H04W 88/04 |
| 2019/0174449 | A1* | 6/2019 | Shan ...................... H04W 60/04 |
| 2020/0314669 | A1 | 10/2020 | Lee |
| 2021/0059005 | A1 | 2/2021 | Hosseini |
| 2021/0250749 | A1 | 8/2021 | Cheng |
| 2021/0289391 | A1* | 9/2021 | Paladugu ............ H04L 47/2491 |
| 2021/0289392 | A1 | 9/2021 | Paladugu |
| 2021/0297992 | A1 | 9/2021 | He |
| 2021/0298043 | A1 | 9/2021 | He |
| 2022/0240212 | A1* | 7/2022 | Chun .................... H04W 68/02 |
| 2022/0286993 | A1* | 9/2022 | Youn .................... H04W 68/005 |
| 2022/0408396 | A1* | 12/2022 | Youn .................... H04W 60/06 |

FOREIGN PATENT DOCUMENTS

| | | |
|---|---|---|
| EP | 3 737 198 A1 | 11/2020 |
| EP | 4 021 047 A1 | 6/2022 |
| WO | 2015/163639 A1 | 10/2015 |
| WO | 2016/163835 A1 | 10/2016 |
| WO | 2016/193864 A1 | 12/2016 |
| WO | 2018/147958 A1 | 8/2018 |

OTHER PUBLICATIONS

Ericsson; "Signalling to support UE-NW relay and Service continuity;" 3GPP TSG-RAN WG2 #89bis Tdoc R2-151148; Apr. 2015; pp. 1-7.

International Search Report and Written Opinion dated Dec. 28, 2012, issued in application No. PCT/CN2020/082142.

ZTE; "Discussion on connection establishment and bearer setup;" 3GPP TSG-RAN WG2 Meeting #96 R2-168149; Nov. 2016; pp. 1-4.

\* cited by examiner

FIG. 8

APPARATUSES AND METHODS FOR SIDELINK (SL) COMMUNICATION IN A USER EQUIPMENT (UE)-TO-UE RELAYING ARCHITECTURE

CROSS REFERENCE TO RELATED APPLICATIONS

This Application is a Continuation of pending National phase application Ser. No. 17/995,009, filed Sep. 29, 2022, now U.S. Pat. No. 11,856,625, which is a 371 National Phase of pending application no. PCT/CN2021/078025, filed Feb. 26, 2021, which claims priority of International Application No. PCT/CN2020/082142, filed on Mar. 30, 2020, the entirety of which is incorporated by reference herein.

FIELD OF THE INVENTION

The application generally relates to mobile communications and, more particularly, to apparatuses and methods for SideLink (SL) communication in a User Equipment (UE)-to-UE relaying architecture.

BACKGROUND OF THE INVENTION

In a typical mobile communication environment, a User Equipment (UE) (also called Mobile Station (MS)), such as a mobile telephone (also known as a cellular or cell phone), or a tablet Personal Computer (PC) with wireless communications capability, may communicate voice and/or data signals to one or more cellular networks. The wireless communications between the UE and the cellular networks may be performed using various Radio Access Technologies (RATs), such as Global System for Mobile communications (GSM) technology, General Packet Radio Service (GPRS) technology, Enhanced Data rates for Global Evolution (EDGE) technology, Wideband Code Division Multiple Access (WCDMA) technology, Code Division Multiple Access 2000 (CDMA-2000) technology, Time Division-Synchronous Code Division Multiple Access (TD-SCDMA) technology, Worldwide Interoperability for Microwave Access (WiMAX) technology, Long Term Evolution (LTE) technology, LTE-Advanced (LTE-A) technology, etc.

These RATs have been adopted for use in various telecommunication standards to provide a common protocol that enables different wireless devices to communicate on a municipal, national, regional, and even global level. An example of an emerging telecommunication standard is the 5G New Radio (NR). The 5G NR is a set of enhancements to the LTE mobile standard promulgated by the Third Generation Partnership Project (3GPP). It is designed to better support mobile broadband Internet access by improving spectral efficiency, reducing costs, and improving services.

In LTE and 5G NR, device-to-device (D2D) communication is supported to allow two or more UEs to directly communicate with one another. This D2D communication may also be referred to as SideLink (SL) communication, and it may be applied to vehicular communication services which are also known as Vehicle-to-Everything (V2X) services. V2X collectively refers to communication technology via all interfaces with vehicles, including Vehicle-to-Vehicle (V2V), Vehicle-to-Infrastructure (V2I), Vehicle-to-Person (V2P), and Vehicle-to-Network (V2N). Particularly, in some cases, two UEs may have data to exchange but they may not be able to communicate with each other directly, due to physical distance or obstructions. For use in such situations, a UE-to-UE relay design is contemplated, in which a relay UE may serve to forward data between two or more remote UEs.

In a layer 2 UE-to-UE relaying architecture, data are delivered from one remote UE (UE1) to another remote UE (UE2) via an intermediate relay UE, by using a protocol stack in which the upper layers, such as the Service Data Adaptation Protocol (SDAP) layer, and the Packet Data Convergence Protocol (PDCP) layer, are end-to-end (i.e., terminated between the remote UEs), while the lower layers, such as the Radio Link Control (RLC) layer, the Media Access Control (MAC) layer, and the Physical (PHY) layer, are hop-by-hop (i.e., terminated between each remote UE and the relay UE). This means that the remote UEs exchange data with the relay UE via one or more channels (e.g., RLC channels) managed in the lower layers, and they exchange data with one another via one or more bearers (e.g., SL Radio Bearers (SLRBs)) managed in the upper layers. In order to route the data from a source remote UE to a target remote UE correctly, the relay UE needs to know the relationship between the upper layer bearers (or the paths taken by the bearers through the relaying system) and the lower layer channels, so that the relay UE can map incoming transmissions (e.g., packets received on an ingress RLC channel from a remote UE) to outgoing transmissions (e.g., packets sent on an egress RLC channel to a remote UE). For this mapping to be unambiguous, the identifier used for the upper layer bearer/path should be unique within the scope of the relay UE. Therefore, it is necessary for the relay UE and the remote UEs to have a coordinated way of assigning and managing identifiers for the end-to-end communication.

SUMMARY OF THE INVENTION

In a first aspect of the application, a method executed by a relay UE is provided. The method comprises the following steps: establishing a first Radio Link Control (RLC) channel between a first remote UE and the relay UE, wherein the first RLC channel is associated with a first end-to-end identifier; establishing a second RLC channel between a second remote UE and the relay UE, wherein the second RLC channel is associated with the first end-to-end identifier or a second end-to-end identifier; receiving an incoming SideLink (SL) transmission from the first remote UE on the first RLC channel, wherein the incoming SL transmission comprises the first end-to-end identifier; and sending an outgoing SL transmission to the second remote UE on the second RLC channel, wherein the outgoing SL transmission comprises one of the first end-to-end identifier and the second end-to-end identifier.

In one implementation form of the first aspect of the application, the outgoing SL transmission comprises the first end-to-end identifier in response to the second RLC channel being associated with the first end-to-end identifier. The method further comprises the following step: determining a mapping of the first RLC channel to the second RLC channel for the outgoing SL transmission based on the first end-to-end identifier.

In another implementation form of the first aspect of the application, the outgoing SL transmission comprises the second end-to-end identifier in response to the second RLC channel being associated with the second end-to-end identifier. The method further comprises the following step: determining a mapping of the first RLC channel to the second RLC channel for the outgoing SL transmission based on the first end-to-end identifier. The first end-to-end identifier may comprise an SL Radio Bearer (SLRB) ID and information of the second remote UE, and the second end-to-end identifier may comprise the SLRB ID and information of the first remote UE. For example, the information of the first remote UE may comprise a first UE ID of the first remote UE, and the information of the second remote UE may comprise a second UE ID of the second remote UE.

In another implementation form of the first aspect of the application, the first RLC channel between the first remote UE and the relay UE is established by: receiving a first reconfiguration message from the first remote UE; and sending a first reconfiguration complete message to the first remote UE. The first end-to-end identifier is indicated in the first reconfiguration message or in the first reconfiguration complete message.

In another implementation form of the first aspect of the application, the second RLC channel between the second remote UE and the relay UE is established by: sending a second reconfiguration message to the second remote UE; and receiving a second reconfiguration complete message from the second remote UE. The first end-to-end identifier is indicated in the second reconfiguration complete message in response to the second RLC channel being associated with the first end-to-end identifier, or the second end-to-end identifier is indicated in the second reconfiguration complete message in response to the second RLC channel being associated with the second end-to-end identifier. Alternatively, the first end-to-end identifier is indicated in the second reconfiguration message in response to the second RLC channel being associated with the first end-to-end identifier, or the second end-to-end identifier is indicated in the second reconfiguration message in response to the second RLC channel being associated with the second end-to-end identifier.

In a second aspect of the application, a method executed by a first remote UE is provided. The method comprises the following steps: establishing an RLC channel between the first remote UE and a relay UE, wherein the first RLC channel is associated with an end-to-end identifier; establishing an SLRB between the first remote UE and a second remote UE after the RLC channel is established, wherein the SLRB is associated with the end-to-end identifier; and sending an SL transmission for the second remote UE on the RLC channel after the SLRB is established, wherein the SL transmission comprises the end-to-end identifier.

In one implementation form of the second aspect of the application, the RLC channel between the first remote UE and the relay UE is established by: sending a first reconfiguration message to the relay UE; and receiving a first reconfiguration complete message from the relay UE. The first remote UE may determine the end-to-end identifier, and indicate the end-to-end identifier in the first reconfiguration message. Alternatively, the end-to-end identifier may be indicated in the first reconfiguration complete message.

In another implementation form of the second aspect of the application, the SLRB between the first remote UE and the second remote UE is established by: sending a second reconfiguration message to the second remote UE via the relay UE; and receiving a second reconfiguration complete message from the second remote UE via the relay UE.

In another implementation form of the second aspect of the application, the end-to-end identifier comprises an SLRB ID and information of the second remote UE. For example, the information of the second remote UE comprises a UE ID of the second remote UE.

Other aspects and features of the present application will become apparent to those with ordinarily skill in the art upon review of the following descriptions of specific embodiments of the methods for SL communication in a UE-to-UE relaying architecture.

BRIEF DESCRIPTION OF THE DRAWINGS

The present application can be more fully understood by reading the subsequent detailed description and examples with references made to the accompanying drawings, wherein.

DETAILED DESCRIPTION

The following description is made for the purpose of illustrating the general principles of the application and should not be taken in a limiting sense. It should be understood that the embodiments may be realized in software, hardware, firmware, or any combination thereof. The terms "comprises", "comprising", "includes", and/or "including" when used herein, specify the presence of stated features, integers, steps, operations, elements, and/or components, but do not preclude the presence or addition of one or more other features, integers, steps, operations, elements, components, and/or groups thereof.

Figure 1:
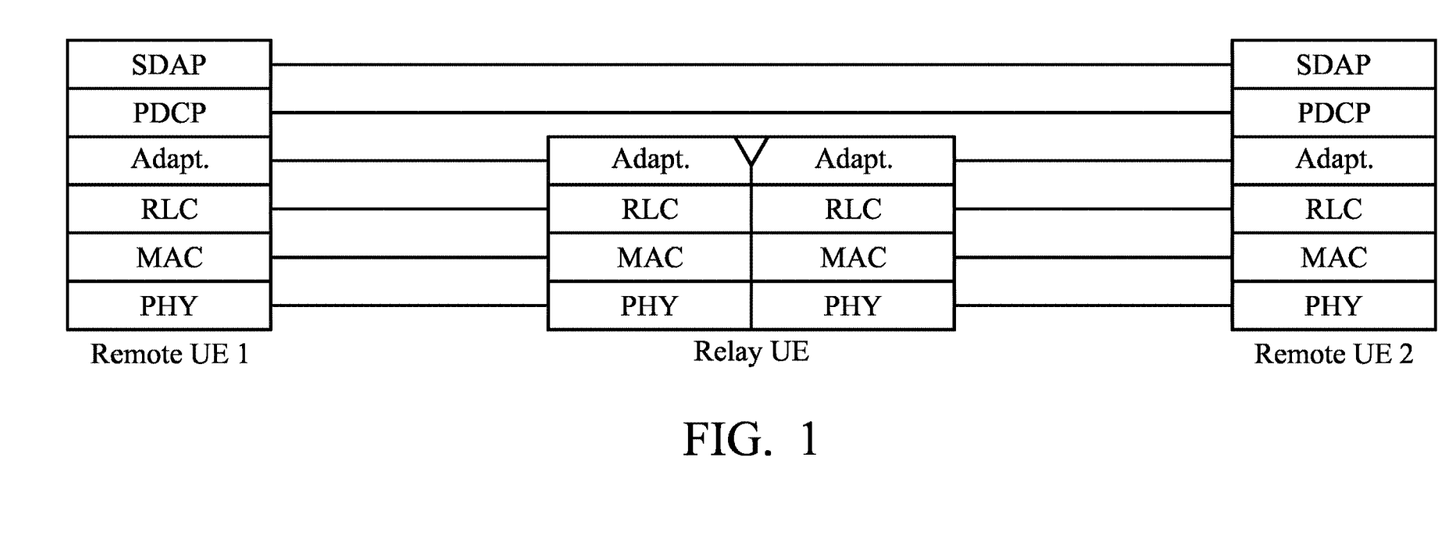
FIG. 1 is a block diagram illustrating exemplary user-plane protocol stacks for a layer 2 UE-to-UE relaying architecture according to an embodiment of the application.

FIG. 1 is a block diagram illustrating exemplary user-plane protocol stacks for a layer 2 UE-to-UE relaying architecture according to an embodiment of the application.

As shown in FIG. 1, the user-plane protocol stack for a remote UE may include a Service Data Adaptation Protocol (SDAP) layer, a Packet Data Convergence Protocol (PDCP) layer, an adaptation layer, a Radio Link Control (RLC) layer, a Media Access Control (MAC) layer, and a Physical (PHY) layer. All these layers, except for the adaptation layer, may be modelled on those already developed for SL communication in release 16 of the 3GPP specifications. The adaptation layer is specific to the relaying environment, and has the function of mapping upper-layer bearers to lower-layer channels in a way that supports forwarding by the relay UE. In particular, the SDAP and PDCP layers are end-to-end (i.e., terminated between the remote UEs), while the adaptation, RLC, MAC, and PHY layers are hop-by-hop (i.e., terminated between one remote UE and the relay UE).

It should be understood that the protocol stacks shown in FIG. 1 are for illustrative purposes only and are not intended to limit the scope of the application. The protocol stacks may be replicated across different sets of UEs, so that, for example, a single relay UE may have multiple peer remote UEs, in any combination of correspondences with each other. In one example, remote UE 1 may communicate with both remote UE 2 and remote UE 3 through the same relay UE. In this case, UEs 1 and 2 would instantiate a first set of the protocol stacks, and UEs 1 and 3 would instantiate a second set of the protocol stacks.

Although not shown, the control-plane protocol stacks for such UE-to-UE relaying architecture may be similar, with the exception that the SDAP layer should be omitted and a control protocol layer, such as a PC5 Radio Resource Control (PC5-RRC) layer, should be added on top of the PDCP layer.

In a layer 2 UE-to-UE relaying architecture, there are "bearer" or "channel" constructs at two distinct levels, wherein "channel" may refer to RLC channels which are managed by the RLC layer and used for connecting the remote UEs with the relay UE, and "bearer" may refer to SLRBs which are managed by the PDCP layer and used for connecting the remote UEs with one another.

Figure 2:
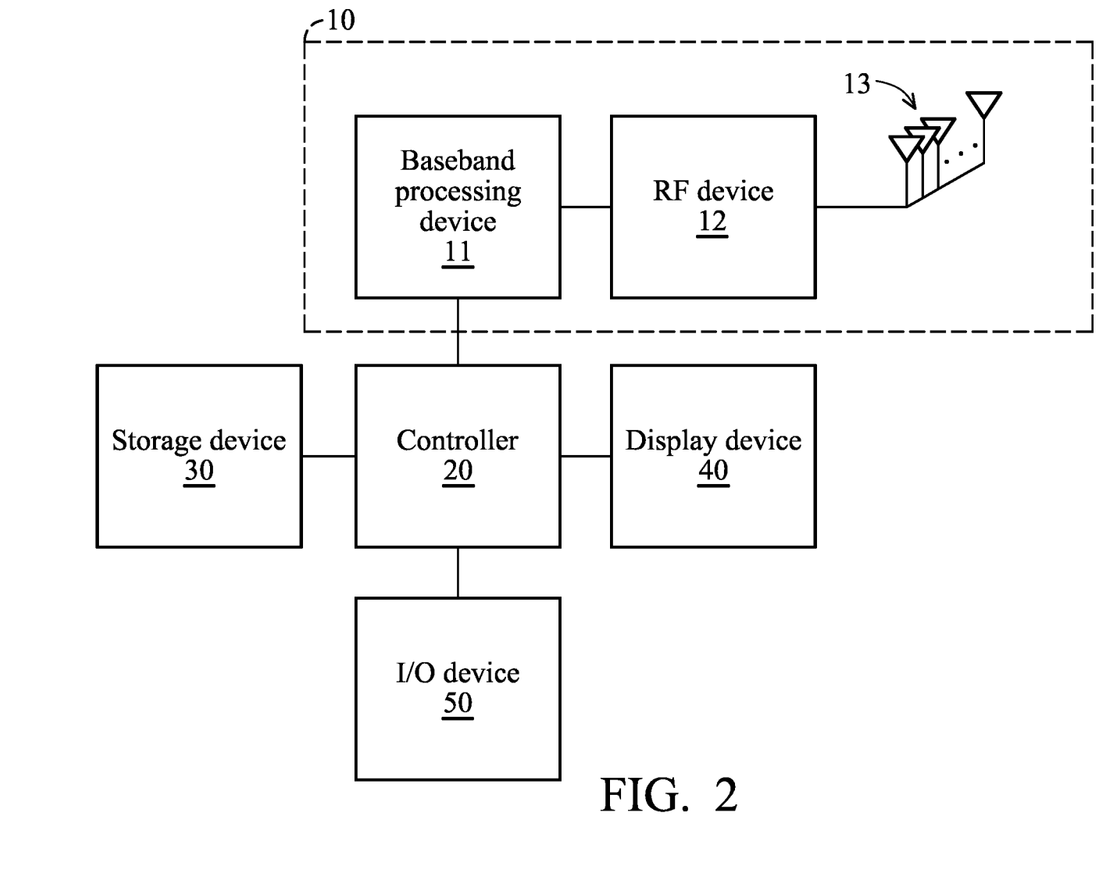
FIG. 2 is a block diagram illustrating a UE according to an embodiment of the application.

FIG. 2 is a block diagram illustrating a UE according to an embodiment of the application.

In this embodiment, the UE may refer to either a relay UE or a remote UE (i.e., a transmitting remote UE or a recipient remote UE in a UE-to-UE relaying architecture).

As shown in FIG. 2, a UE may include a wireless transceiver 10, a controller 20, a storage device 30, a display device 40, and an Input/Output (I/O) device 50.

The wireless transceiver 10 is configured to perform wireless transmission and reception to and from other UEs and/or a Base Station (BS) of a cellular network (e.g., a 5G NR network).

Specifically, the wireless transceiver 10 may include a baseband processing device 11, a Radio Frequency (RF) device 12, and antenna 13, wherein the antenna 13 may include an antenna array for beamforming.

The baseband processing device 11 is configured to perform baseband signal processing and control the communications between subscriber identity card(s) (not shown) and the RF device 12. The baseband processing device 11 may contain multiple hardware components to perform the baseband signal processing, including Analog-to-Digital Conversion (ADC)/Digital-to-Analog Conversion (DAC), gain adjusting, modulation/demodulation, encoding/decoding, and so on.

The RF device 12 may receive RF wireless signals via the antenna 13, convert the received RF wireless signals to baseband signals, which are processed by the baseband processing device 11, or receive baseband signals from the baseband processing device 11 and convert the received baseband signals to RF wireless signals, which are later transmitted via the antenna 13. The RF device 12 may also contain multiple hardware devices to perform radio frequency conversion. For example, the RF device 12 may comprise a mixer to multiply the baseband signals with a carrier oscillated in the radio frequency of the supported RAT(s), wherein the radio frequency may be any radio frequency (e.g., 30 GHz-300 GHz for mmWave) utilized in the 5G NR technology, or may be 900 MHz, 2100 MHz, or 2.6 GHz utilized in LTE/LTE-A/TD-LTE technology, or another radio frequency, depending on the RAT in use.

The controller 20 may be a general-purpose processor, a Micro Control Unit (MCU), an application processor, a Digital Signal Processor (DSP), a Graphics Processing Unit (GPU), a Holographic Processing Unit (HPU), a Neural Processing Unit (NPU), or the like, which includes various circuits for providing the functions of data processing and computing, controlling the wireless transceiver 10 for wireless communication with other UEs and/or the BS, storing and retrieving data (e.g., program code) to and from the storage device 30, sending a series of frame data (e.g. representing text messages, graphics, images, etc.) to the display device 40, and receiving user inputs or outputting signals via the I/O device 50.

In particular, the controller 20 coordinates the aforementioned operations of the wireless transceiver 10, the storage device 30, the display device 40, and the I/O device 50 for performing the method for SL communication in a UE-to-UE relaying architecture.

In another embodiment, the controller 20 may be incorporated into the baseband processing device 11, to serve as a baseband processor.

As will be appreciated by persons skilled in the art, the circuits of the controller 20 will typically include transistors that are configured in such a way as to control the operation of the circuits in accordance with the functions and operations described herein. As will be further appreciated, the specific structure or interconnections of the transistors will typically be determined by a compiler, such as a Register Transfer Language (RTL) compiler. RTL compilers may be operated by a processor upon scripts that closely resemble assembly language code, to compile the script into a form that is used for the layout or fabrication of the ultimate circuitry. Indeed, RTL is well known for its role and use in the facilitation of the design process of electronic and digital systems.

The storage device 30 may be a non-transitory machine-readable storage medium, including a memory, such as a FLASH memory or a Non-Volatile Random Access Memory (NVRAM), or a magnetic storage device, such as a hard disk or a magnetic tape, or an optical disc, or any combination thereof for storing data, instructions, and/or program code of applications, communication protocols as shown in FIG. 1, and/or the method for SL communication in a UE-to-UE relaying architecture.

The display device 40 may be a Liquid-Crystal Display (LCD), a Light-Emitting Diode (LED) display, an Organic LED (OLED) display, or an Electronic Paper Display (EPD), etc., for providing a display function. Alternatively, the display device 40 may further include one or more touch sensors disposed thereon or thereunder for sensing touches, contacts, or approximations of objects, such as fingers or styluses.

The I/O device 50 may include one or more buttons, a keyboard, a mouse, a touch pad, a video camera, a microphone, and/or a speaker, etc., to serve as the Man-Machine Interface (MMI) for interaction with users.

It should be understood that the components described in the embodiment of FIG. 2 are for illustrative purposes only and are not intended to limit the scope of the application. For example, a UE may include more components, such as a power supply, and/or a Global Positioning System (GPS) device, wherein the power supply may be a mobile/replaceable battery providing power to all the other components of the UE, and the GPS device may provide the location information of the UE for use by some location-based services or applications. Alternatively, a UE may include fewer components. For example, the UE may not include the display device 40 and/or the I/O device 50.

Figure 3:
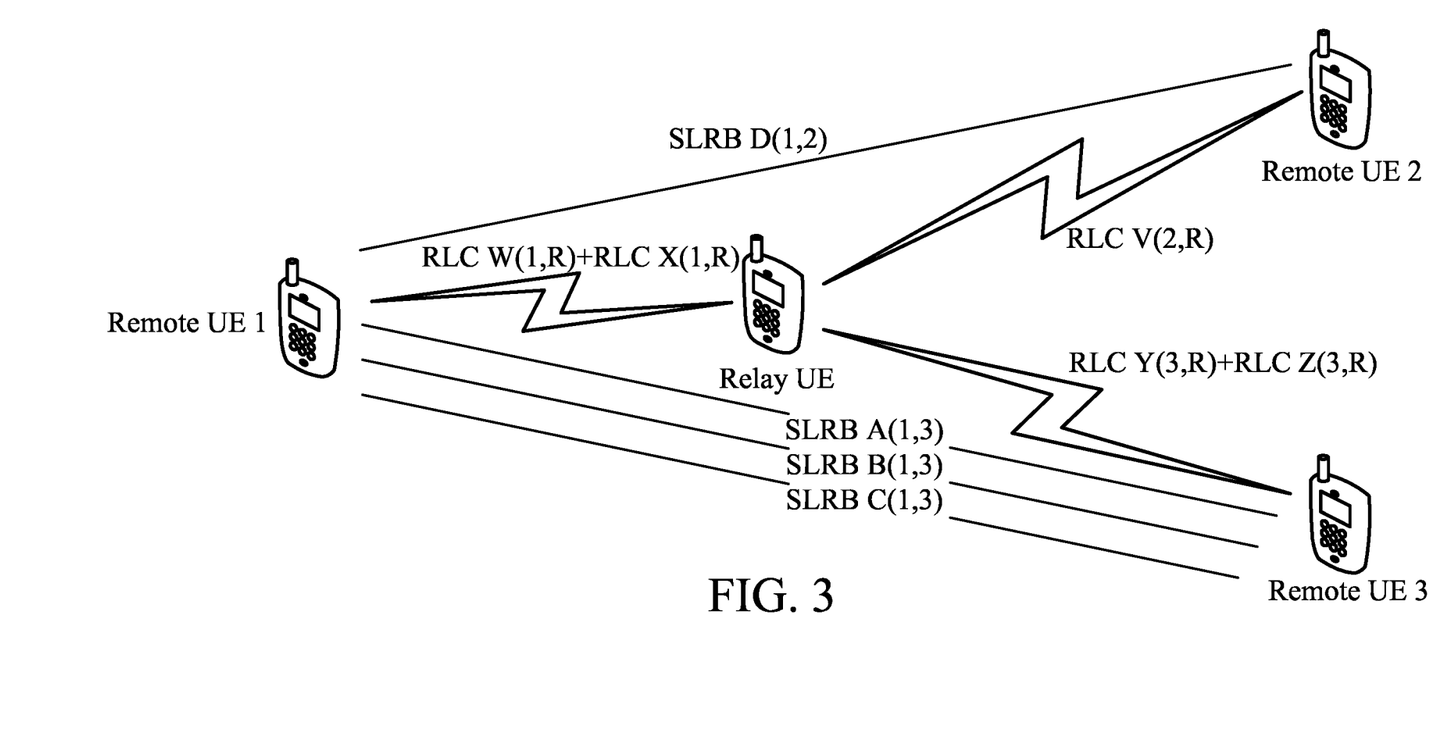
FIG. 3 is a schematic diagram illustrating the relationship between SLRBs and RLC channels in an exemplary layer 2 UE-to-UE relaying architecture.

FIG. 3 is a schematic diagram illustrating the relationship between SLRBs and RLC channels in an exemplary layer 2 UE-to-UE relaying architecture.

As shown in FIG. 3, there are three remote UEs and one relay UE serving these remote UEs. Specifically, remote UEs 1 and 2 communicate with each other on a single SLRB (denoted as SLRB D(1,2) in FIG. 3), and remote UEs 1 and 3 communicate with each other on three different SLRBs (denoted as SLRB A(1,3), SLRB B(1,3), and SLRB C(1,3) in FIG. 3). Although these SLRBs are shown as connecting the remote UEs directly with one another, it should be understood that the actual data delivery on these end-to-end bearers goes through the relay UE.

In addition, the relay UE and these remote UEs communicate over a variety of RLC channels. For example, remote UE 1 and the relay UE communicate on two RLC channels (denoted as W(1,R) and X(1,R) in FIG. 3), remote UE 2 and the relay UE communicate on a single RLC channel (denoted as V(2,R) in FIG. 3), and remote UE 3 and the relay UE communicate on two RLC channels (denoted as Y(3,R) and Z(3,R) in FIG. 3).

Figure 4:
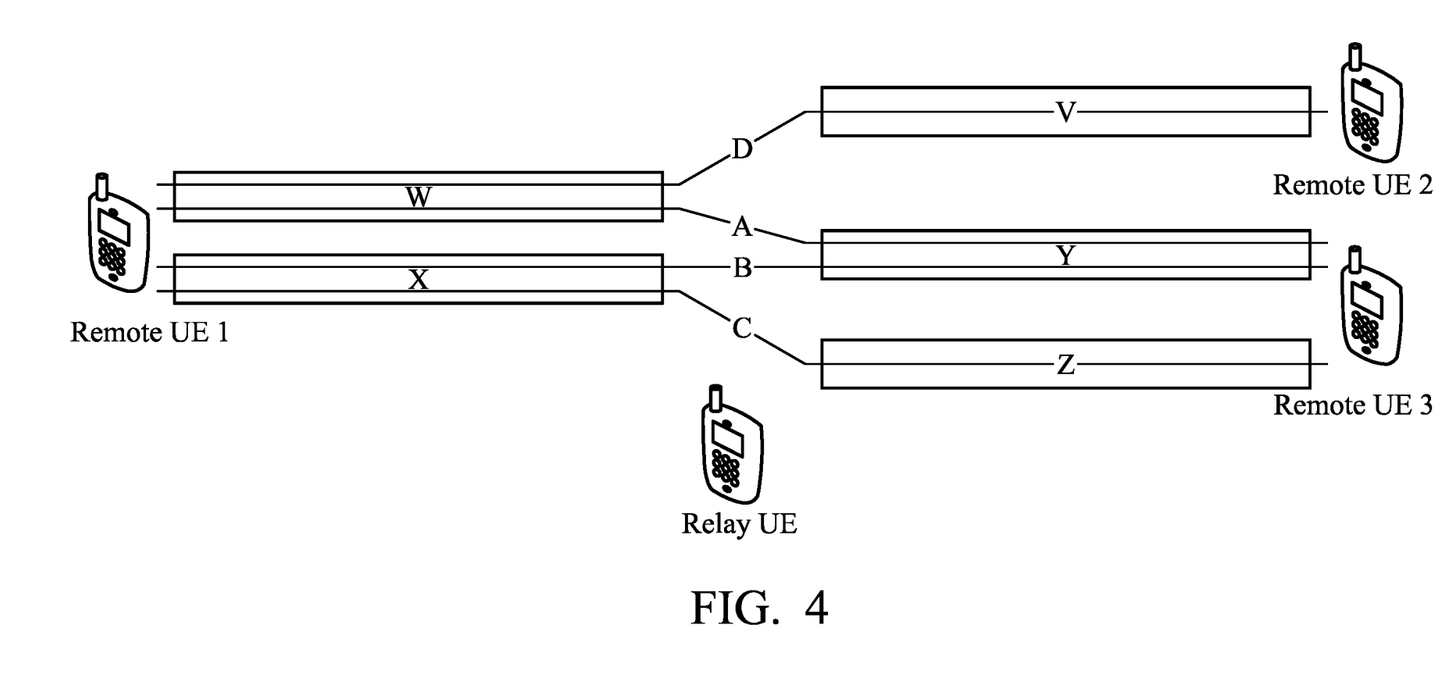
FIG. 4 is a schematic diagram illustrating the mapping of SLRBs to RLC channels in accordance with the embodiment of FIG. 3.

The mapping of SLRBs to RLC channels in the embodiment of FIG. 3 may be further illustrated in FIG. 4. As shown in FIG. 4, SLRB D(1,2) is mapped to RLC channels W(1,R) and V(2,R); SLRB A(1,3) is mapped to RLC channels W(1,R) and Y(3,R); SLRB B(1,3) is mapped to RLC channels X(1,R) and Y(3,R); and SLRB C(1,3) is mapped to RLC channels X(1,R) and Z(3,R).

It should be note that the SLRBs cannot necessarily be expected to have globally unique IDs. That is, the identifiers A/B/C/D are not assumed to correspond directly to any distinguishing value that is known to all UEs. According to the 3GPP specifications for SL communication, each remote UE has a set of identifiers for its bearers with a given peer (for the receiving UE, these identifiers are given by the information element SLRB-PC5-ConfigIndex in the RRCReconfigurationSidelink message when the bearer is set up), but the indices of these identifiers may collide for different UEs. For example, in the scenario of FIGS. 3-4, remote UE 2 may have index 1 associated with SLRB D, while remote UE 3 may have index 1 associated with SLRB A. Consider now a packet that arrives at the relay UE from remote UE 1 on the ingress RLC channel W(1,R). According to the mapping in the scenario of FIG. 4, this packet may be associated with either SLRB D or SLRB A, and in order to forward the packet to the correct recipient on the correct egress RLC channel, the relay UE must determine which SLRB is involved. However, the relay UE cannot make this determination based solely on the SL Logical Channel ID (LCID), since the logical channel corresponds only to the RLC channel, to which multiple SLRBs are mapped.

In one novel aspect of the present application, an end-to-end identifier is indicated to the relay UE along with each packet, wherein the end-to-end identifier specifically refers to information that may assist the relay UE to disambiguate the routing for a packet received on a particular RLC channel.

To further clarify, the end-to-end identifier may be negotiated between the relay UE and the remote UEs when the RLC channels and/or SLRBs are established. The end-to-end identifier may be indicated in the adaptation layer, for example, as part of an adaptation layer header or subheader associated with a data packet. Alternatively, since the layers below the adaptation layer are processed at the relay UE when the packet is received, the end-to-end identifier may be indicated in any of the lower layers, such as the MAC layer along with the SL LCID.

For example, if the end-to-end identifier is indicated in the MAC layer, it may be understood as an extension to the LCID space. In this case, the transmitting remote UE may indicate in the MAC layer (for instance, in a MAC subheader) an SL LCID and also an "extended LCID" that corresponds to a particular pair of RLC channels. In the scenario of FIG. 4, the pair of RLC channels W (ingress) and V (egress) may be assigned with one extended LCID, and the pair of RLC channels W (ingress) and Y (egress) may be assigned with another extended LCID. The relay UE may process the extended LCID to determine the egress RLC channel.

Moreover, the end-to-end identifier may also need to be provided to the recipient remote UE. For example, consider a packet arriving at remote UE 3 on RLC channel Y in the scenario of FIG. 4, remote UE 3 needs to determine if it is receiving this packet for SLRB A or SLRB B. Knowing the LCID does not provide sufficient information, since each LCID corresponds to an RLC channel and the concerned RLC channel (i.e., RLC channel Y) has two SLRBs mapped to it. Accordingly, it may be necessary for the relay UE to deliver the end-to-end identifier along with data packets for a recipient remote UE.

In one embodiment, the end-to-end identifier may be a combination of an SL Radio Bearer (SLRB) ID and information (e.g., layer-2 UE ID, MAC address) of the transmitting remote UE and/or the recipient remote UE. Specifically, the end-to-end identifier may be separately assigned for each RLC channel, so that a packet arriving at the relay UE on SLRB D on RLC channel W may be accompanied by a different value of the end-to-end identifier than the same packet sent by the relay UE on SLRB D on RLC channel V in the scenario of FIG. 4. For example, remote UE 1 may send a packet on RLC channel W with an end-to-end identifier which includes an SLRB ID (e.g., SLRB D) and the UE ID of the recipient remote UE (e.g., remote UE 2), and the relay UE may determine the egress RLC channel to be RLC channel V based on the end-to-end identifier and replace the UE ID in the end-to-end identifier with the UE ID of the transmitting remote UE (i.e., remote UE 1) before forwarding the packet with the end-to-end identifier.

In another embodiment, the end-to-end identifier may be a path identifier maintained at the relay UE, which corresponds to a particular pair of RLC channels and thus represents a transmission path between two remote UEs. That is, the end-to-end identifier may be common across the whole transmission path. For example, a packet sent on SLRB D may be assigned with the same end-to-end identifier on RLC channel W (for transmission from remote UE 1 to the relay UE) and on RLC channel V (for transmission from the relay UE to remote UE 2) in the scenario of FIG. 4. A transmission path may be determined (by the relay UE, or by negotiation between the relay UE and one or more remote UEs) before or at the time of setting up an SLRB, and a path ID (which must be unique at the relay UE) may be assigned to reflect the applicable RLC channels. As a result, the path ID will be associated with the SLRB at SLRB setup, and each transmitted packet on the SLRB would be accompanied by the corresponding path ID included in a protocol layer (e.g., the adaptation layer) visible to the relay UE. For example, the UE that initiates setup of the SLRB (e.g., a remote UE) may indicate the corresponding path ID in the RRCReconfigurationSidelink message to set up one or more RLC channels that carry the SLRB, or the responding UE (e.g., the relay UE) may indicate the path ID in the RRCReconfigurationCompleteSidelink message that confirms setup of one or more RLC channels that carry the SLRB. It should be noted that unlike the design used in Integrated Access and Backhaul (IAB) in compliance with release 16 of the 3GPP specifications, where a destination and a path ID are included in the Backhaul Adaptation Protocol (BAP) Protocol Data Unit (PDU) header, the end-to-end identifier used in the present application only needs to include the path ID and it suffices for the relay UE to determine the egress RLC channel, allowing the relay UE to forward the packet to the correct destination UE.

Figure 5:
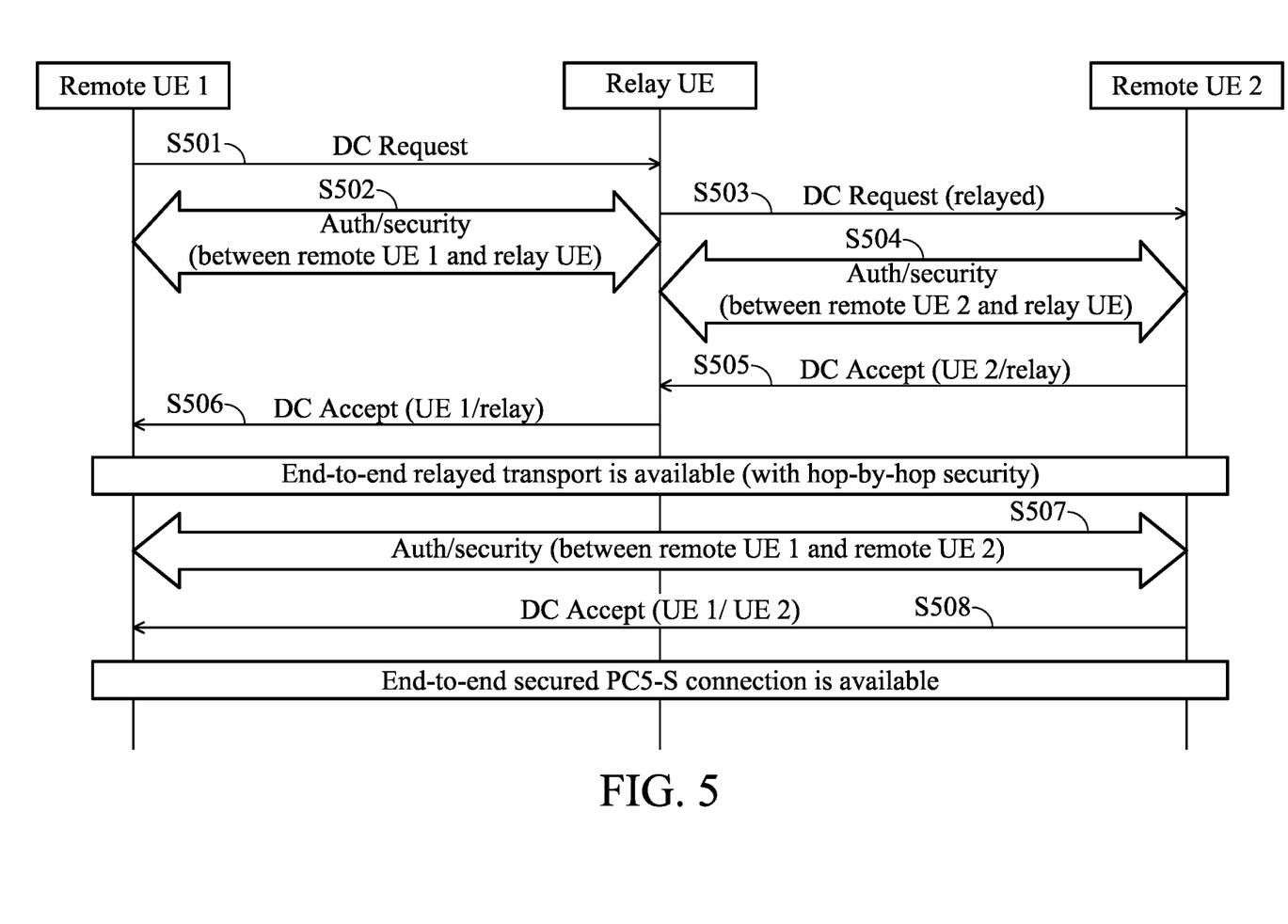
FIG. 5 is a message sequence chart illustrating a connection setup procedure in a UE-to-UE relaying architecture according to an embodiment of the application.

FIG. 5 is a message sequence chart illustrating a connection setup procedure in a UE-to-UE relaying architecture according to an embodiment of the application.

In the UE-to-UE relaying architecture, the connection setup procedure may be initiated by a remote UE that wants to transmit data to another remote UE. In this embodiment, it is remote UE 1 that initiates the connection setup procedure because it wants to transmit data to remote UE 2.

In steps 501~502, remote UE 1 sends a Direct Communication (DC) Request message to the relay UE (e.g., by broadcast) and performs the authentication and security procedure with the relay UE.

In steps S503~S504, relay UE forwards the DC Request message to remote UE 2 (e.g., by broadcast) and performs the authentication and security procedure with remote UE 2.

In steps S505~S506, relay UE receives a first DC Accept message from remote UE 2 and transmits a second DC Accept message to remote UE 1.

At this point, an end-to-end relayed transport with hop-by-hop security is established and available after remote UE 1 receives the second DC Accept message.

In steps S507~S508, remote UE 1 performs the authentication and security procedure with remote UE 2 and receives a DC Accept message from remote UE 2 over the end-to-end relayed transport.

At this point, an end-to-end secured PC5-S connection is established and available for subsequent RLC channels and SLRB setup. Note that the PC5-S connection between remote UE 1 and remote UE 2 passes through the relay UE, but security is assumed to be end-to-end, so that the relay UE cannot read the contents of data packets or signaling messages being exchanged between these two remote UEs.

Figure 6:
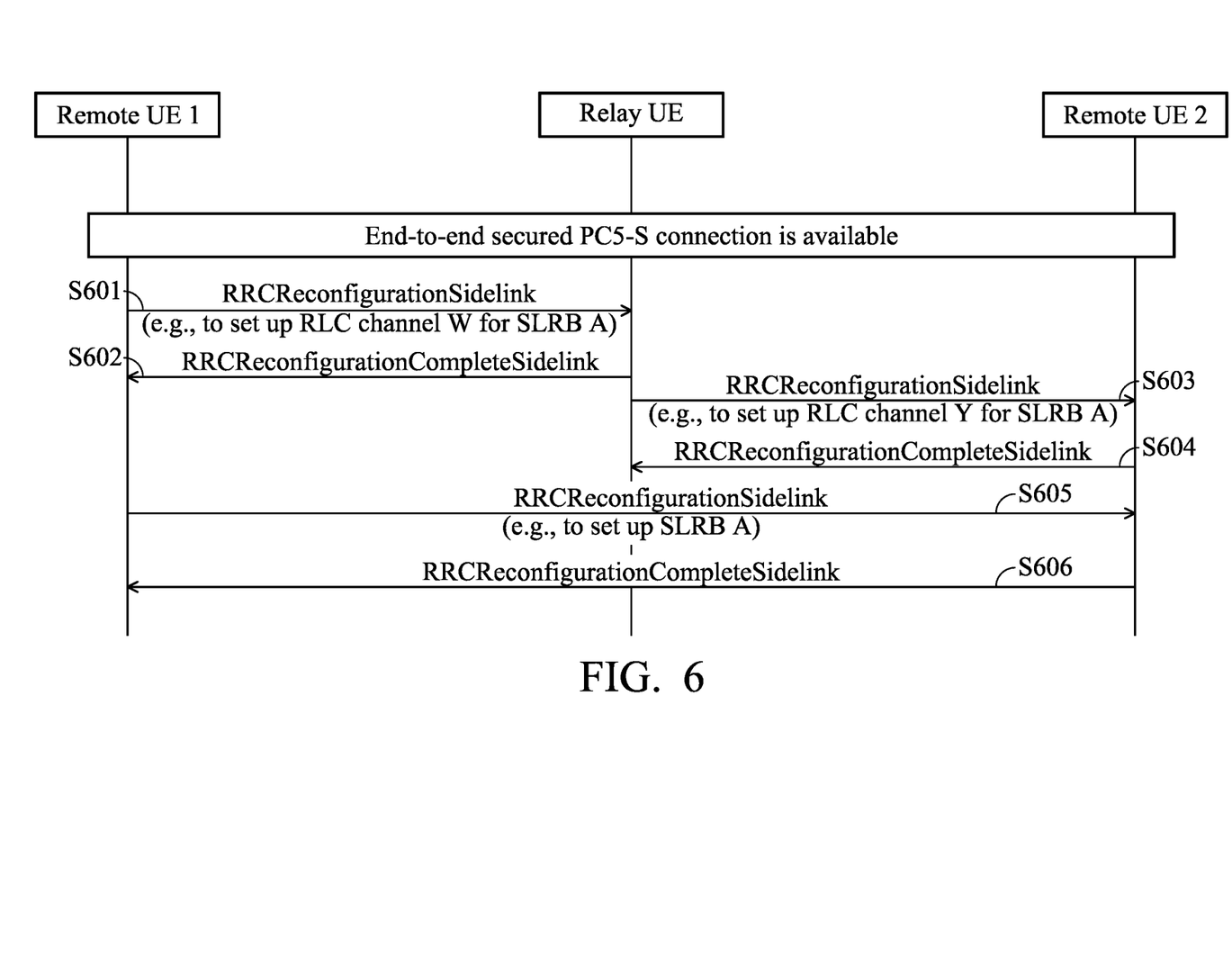
FIG. 6 is a message sequence chart illustrating the setup of RLC channels and an SLRB in a UE-to-UE relaying architecture according to an embodiment of the application.

FIG. 6 is a message sequence chart illustrating the setup of RLC channels and an SLRB in a UE-to-UE relaying architecture according to an embodiment of the application.

In this embodiment, the RLC channels and SLRB setup takes place after a connection setup procedure as described in the embodiment of FIG. 5 is completed to provide an end-to-end secured PC5-S connection between remote UE 1 and remote UE 2.

In step S601, remote UE 1 sends a first RRCReconfigurationSidelink message to the relay UE, requesting the setup of RLC channels for communication between remote UE 1 and the relay UE. The first RRCReconfigurationSidelink message may include configurations for only certain protocol layers (e.g., only the lower layers that are terminated between remote UE 1 and the relay UE). For the protocol stacks as shown in FIG. 1, this would mean that the first RRCReconfigurationSidelink message may include configurations for the PHY, MAC, RLC, and adaptation layers. In some embodiments, the first RRCReconfigurationSidelink message may also indicate one or more values for the end-to-end identifier to be mapped to the RLC channel(s) configured by the first RRCReconfigurationSidelink message (e.g., "set up RLC channel W, which will carry SLRB A" in the scenario of FIG. 4). In other words, the end-to-end identifier values may be assigned by the initiating/transmitting remote UE. The first RRCReconfigurationSidelink message may also indicate the destination of the SLRB intended to be set up, so that the relay UE can trigger setup of RLC channels with the destination/recipient remote UE. The first RRCReconfigurationSidelink message may also indicate one or more parameters of the SLRB intended to be set up, so that the relay UE can infer appropriate parameters for configuring RLC channel(s) with the destination/recipient remote UE.

In step S602, the relay UE responds with a first RRCReconfigurationCompleteSidelink message, indicating that the reconfiguration requested in step S601 has been performed. In some embodiments, the first RRCReconfigurationCompleteSidelink message may indicate one or more values for the end-to-end identifier to be mapped to the RLC channel(s) configured by the first RRCReconfigurationSidelink message. In other words, the end-to-end identifier values may be assigned by the relay UE, instead of the initiating/transmitting remote UE.

In step S603, the relay UE sends a second RRCReconfigurationSidelink message to remote UE 2, to establish one or more RLC channels for communication between the relay UE and remote UE 2. The second RRCReconfigurationSidelink message may include configurations for only certain protocol layers (e.g., the layers terminating between the relay and remote UE 2). In some embodiments, the second RRCReconfigurationSidelink message may also indicate one or more values for the end-to-end identifier to be mapped to the RLC channel(s) configured by the second RRCReconfigurationSidelink message (e.g., "set up RLC channel Y, which will carry SLRB A"). An end-to-end identifier value indicated in the second RRCReconfigurationSidelink message may be the same as, or different from, an end-to-end identifier value for the same SLRB that was assigned in steps S601~S602.

In step S604, remote UE 2 sends a second RRCReconfigurationCompleteSidelink message to the relay UE, indicating that the reconfiguration requested in step S603 has been performed. In some embodiments, the second RRCReconfigurationCompleteSidelink message may also indicate one or more values for the end-to-end identifier to be mapped to the RLC channel(s) configured by the second RRCReconfigurationSidelink message. An end-to-end identifier value indicated in the second RRCReconfigurationCompleteSidelink message may be the same as, or different from, an end-to-end identifier value for the same SLRB that was assigned in steps S601~S602.

In step S605, remote UE 1 sends a third RRCReconfigurationSidelink message to remote UE2 (via the relay UE, using the secured PC5-S connection between remote UE 1 and remote UE 2). The third RRCReconfigurationSidelink message may include configurations for only certain protocol layers (e.g., the upper layers that terminate between the remote UEs). In the protocol stacks shown in FIG. 1, this would mean that the third RRCReconfigurationSidelink message may include configurations for only the PDCP and SDAP layers. The third RRCReconfigurationSidelink message may configure one or more SLRBs between remote UE 1 and remote UE 2, which can be mapped to the RLC channels that were configured in steps S601 and S603.

In step S606, remote UE 2 sends a third RRCReconfigurationCompleteSidelink message to remote UE 1, indicating that the reconfiguration requested in step S605 has been completed.

It should be noted that, in the embodiment of FIG. 6, the SLRB does not yet exist when the RLC channels are set up in steps S601~S604. That is, steps S601~S604 involve configuring the transport for a non-existent bearer, with the assumption that it will be possible to set up the bearer later. Alternatively, it may be possible to perform steps S605-S606 before step S601, i.e., to set up the SLRB before setting up its corresponding RLC channels. This alternative may create a situation in which the SLRB exists without the support of lower layers, and there would be no way to transport actual traffic for the SLRB until steps S601-S604 are executed and the corresponding RLC channels are established.

Figure 7:
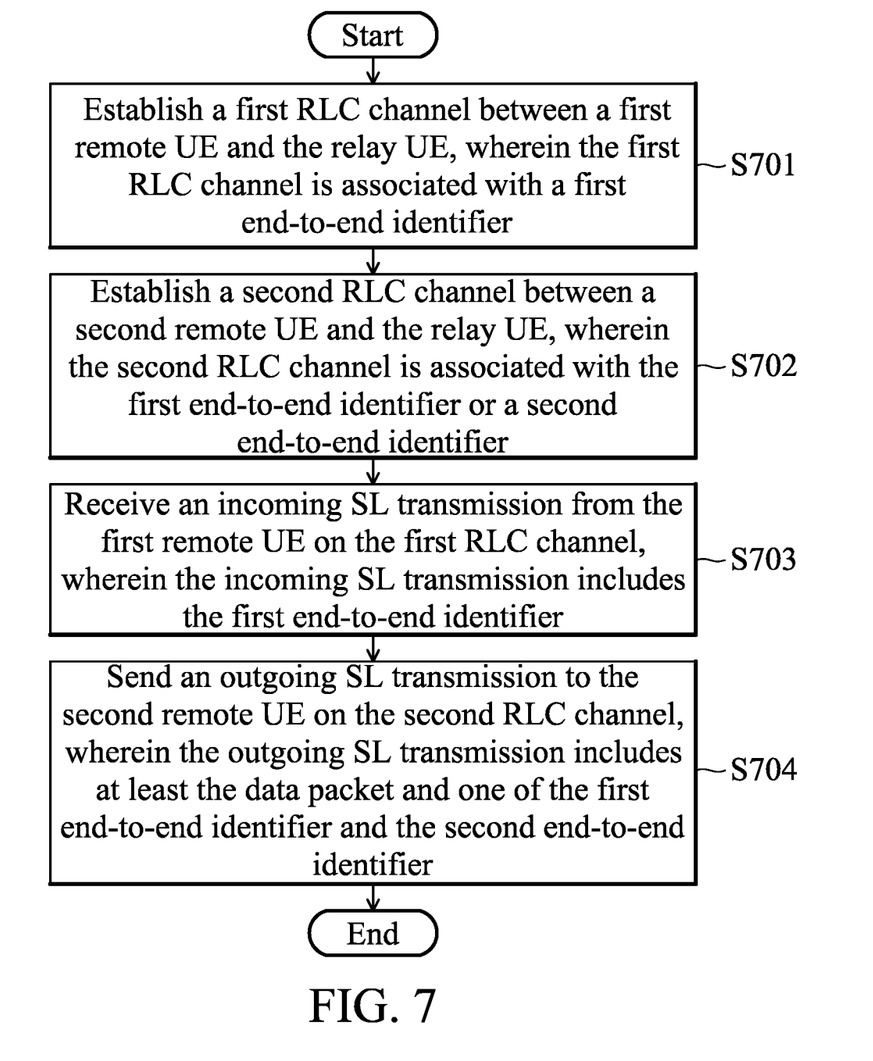
FIG. 7 is a flow chart illustrating the method for a relay UE to support SL communication in a UE-to-UE relaying architecture according to an embodiment of the application.

FIG. 7 is a flow chart illustrating the method for a relay UE to support SL communication in a UE-to-UE relaying architecture according to an embodiment of the application.

In step S701, the relay UE establishes a first RLC channel between a first remote UE and the relay UE, wherein the first RLC channel is associated with a first end-to-end identifier. For example, the first RLC channel may be established through the RRC reconfiguration procedure for SL communication as described in steps S601~S602 of FIG. 6.

In step S702, the relay UE establishes a second RLC channel between a second remote UE and the relay UE, wherein the second RLC channel is associated with the first end-to-end identifier or a second end-to-end identifier. For example, the second RLC channel may be established through the RRC reconfiguration procedure for SL communication as described in steps S603~S604 of FIG. 6.

In step S703, the relay UE receives an incoming SL transmission from the first remote UE on the first RLC channel, wherein the incoming SL transmission includes the first end-to-end identifier.

In step S704, the relay UE sends an outgoing SL transmission to the second remote UE on the second RLC channel, wherein the outgoing SL transmission includes at least the data packet and one of the first end-to-end identifier and the second end-to-end identifier.

In one embodiment, the outgoing SL transmission may include at least a data packet and the first end-to-end identifier in response to the second RLC channel being associated with the first end-to-end identifier. For example, the first end-to-end identifier may be a path identifier which may be used by the relay UE to uniquely determine the mapping of the ingress RLC channel and the egress RLC channel for an SLRB between two remote UEs, and the path identifier is common across the whole transmission path.

In another embodiment, the outgoing SL transmission may include at least a data packet and the second end-to-end identifier in response to the second RLC channel being associated with the second end-to-end identifier. For example, the first end-to-end identifier may consist of an identifier (e.g., an SLRB identity) for the SLRB carried by the first and second RLC channels and information (e.g., UE ID or MAC address) of the destination/recipient remote UE, while the second end-to-end identifier may consist of an identifier (e.g., an SLRB identity) for the SLRB carried by the first and second RLC channels and information (e.g., UE ID or MAC address) of the transmitting/initiating remote UE. That is, the first end-to-end identifier and the second end-to-end identifier may be separately assigned for each of the first RLC channel and the second RLC channel, and the relay UE may determine a mapping of the first RLC channel to the second RLC channel for the outgoing SL transmission based on the first end-to-end identifier.

Figure 8:
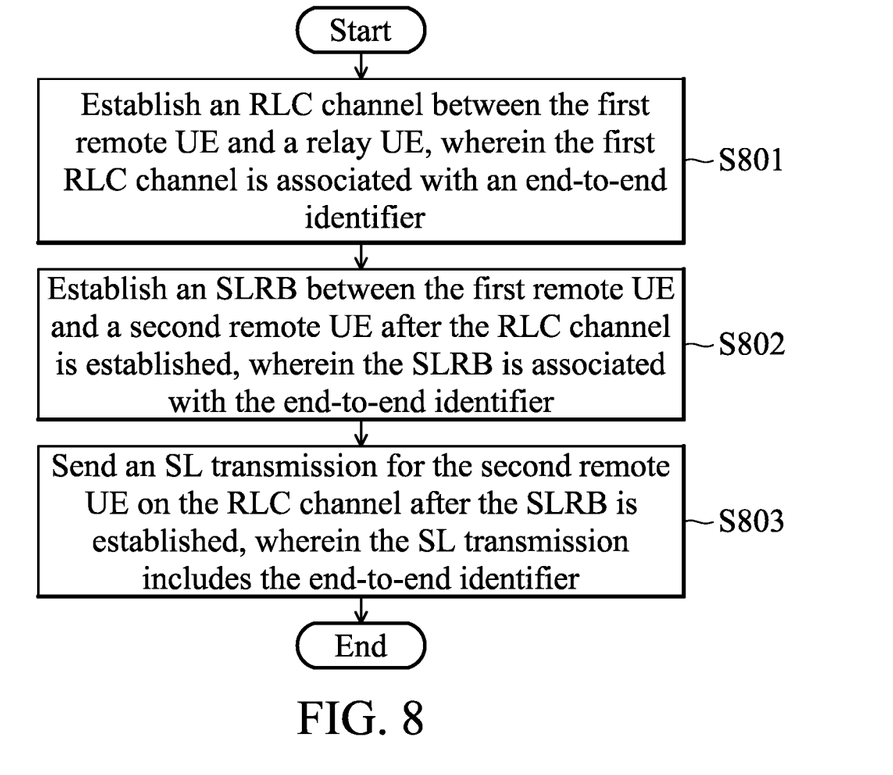
FIG. 8 is a flow chart illustrating the method for a first remote UE to support SL communication in a UE-to-UE relaying architecture according to an embodiment of the application.

FIG. 8 is a flow chart illustrating the method for a first remote UE to support SL communication in a UE-to-UE relaying architecture according to an embodiment of the application.

In this embodiment, the first remote UE may refer to a remote UE that initiates SL communication with another remote UE through UE-to-UE relaying.

In step S801, the first remote UE establishes an RLC channel between the first remote UE and a relay UE, wherein the first RLC channel is associated with an end-to-end identifier. For example, the RLC channel may be established through the RRC reconfiguration procedure for SL communication as described in steps S601~S602 of FIG. 6.

In step S802, the first remote UE establishes an SLRB between the first remote UE and a second remote UE after the RLC channel is established, wherein the SLRB is associated with the end-to-end identifier. For example, the SLRB may be established through the RRC reconfiguration procedure for SL communication as described in steps S605-S606 of FIG. 6.

In step S803, the first remote UE sends an SL transmission for the second remote UE on the RLC channel after the SLRB is established, wherein the SL transmission includes the end-to-end identifier.

In one embodiment, the first end-to-end identifier may be a path identifier which may be used by the relay UE to uniquely determine the mapping of the ingress RLC channel and the egress RLC channel for the SLRB between two remote UEs, and the path identifier is common across the whole transmission path.

In another embodiment, the end-to-end identifier may be assigned specifically for the RLC channel, and it may consist of the SLRB and information (e.g., UE ID or MAC address) of the destination/recipient remote UE.

It should be noted that even though the aforementioned embodiments address a single-hop setting, the method of the application may also be adapted to a multi-hop setting. If there are two or more relay UEs between the transmitting remote UE and the recipient remote UE, each relay UE needs to know how to map end-to-end identifiers to its own ingress and egress RLC channels. This means that when SLRBs are established, they must be associated with end-to-end identifiers that are known to the relay UEs. The relay UEs may communicate at setup time to establish mutually agreeable end-to-end identifiers. Then, to transport a packet in a multi-hop setting, each relay UE applies the forwarding procedure as described above.

While the application has been described by way of example and in terms of preferred embodiment, it should be understood that the application is not limited thereto. Those who are skilled in this technology can still make various alterations and modifications without departing from the scope and spirit of this application. Therefore, the scope of the present application shall be defined and protected by the following claims and their equivalents.

Use of ordinal terms such as "first", "second", etc., in the claims to modify a claim element does not by itself connote any priority, precedence, or order of one claim element over another or the temporal order in which acts of a method are performed, but are used merely as labels to distinguish one claim element having a certain name from another element having the same name (but for use of the ordinal term) to distinguish the claim elements.

The invention claimed is:

1. A method, executed by a relay User Equipment (UE), the method comprising:
   receiving an incoming SideLink (SL) transmission from a first remote UE on a first RLC channel,
   wherein the first RLC channel is associated with an SL Radio Bearer (SLRB) ID,
   wherein the incoming SL transmission comprises a first identifier, and the first identifier comprises the SL Radio Bearer (SLRB) ID and a first UE ID; and sending an outgoing SL transmission to a second remote UE on a second RLC channel according to the SL Radio Bearer (SLRB) ID and the first UE ID.

2. The method as claimed in claim 1, wherein the outgoing SL transmission comprises the first UE ID or a second UE ID.

3. The method as claimed in claim 2, wherein the first UE ID is the UE ID of the first remote UE, and the second UE ID is the UE ID of the second remote UE.

4. The method as claimed in claim 1, wherein the first UE ID is the UE ID of the second remote UE, and the second UE ID is the UE ID of the first remote UE.

5. The method as claimed in claim 1, further comprising:
determining the second RLC channel for the outgoing SL transmission based on the SL Radio Bearer (SLRB) ID.

6. The method as claimed in claim 5, further comprising:
determining the second RLC channel for the outgoing SL transmission based on the SL Radio Bearer (SLRB) ID and the first UE ID.

7. A method, executed by a first remote UE, the method comprising:

receiving an incoming SideLink (SL) transmission on a first RLC channel, wherein the first RLC channel is associated with an SL Radio Bearer (SLRB) ID, wherein the incoming SL transmission comprises the SL Radio Bearer (SLRB) ID and a first UE ID; and sending an outgoing SL transmission on a second RLC channel according to the SL Radio Bearer (SLRB) ID.

8. The method as claimed in claim 7, wherein the outgoing SL transmission comprises the first UE ID or a second UE ID.

9. The method as claimed in claim 7, wherein the first UE ID is the UE ID of the second remote UE, and the second UE ID is the UE ID of the first remote UE the end-to-end identifier is indicated in the first reconfiguration complete message.

10. The method as claimed in claim 7, wherein the first UE ID is the UE ID of the first remote UE, and the second UE ID is the UE ID of the second remote UE.

11. The method as claimed in claim 7, further comprising:
determining the second RLC channel for the outgoing SL transmission based on the SL Radio Bearer (SLRB) ID.

* * * * *